US007978591B2

(12) United States Patent
Erickson et al.

(10) Patent No.: US 7,978,591 B2
(45) Date of Patent: Jul. 12, 2011

(54) MITIGATION OF INTERFERENCE AND CROSSTALK IN COMMUNICATIONS SYSTEMS

(75) Inventors: Mark Alan Erickson, Sacramento, CA (US); Thorkell Gudmundsson, San Jose, CA (US); Ioannis Kanellakopoulos, Cupertino, CA (US); John Josef Hench, Los Gatos, CA (US)

(73) Assignee: Tokyo Electron Limited, Tokyo (JP)

( * ) Notice: Subject to any disclaimer, the term of this patent is extended or adjusted under 35 U.S.C. 154(b) by 277 days.

(21) Appl. No.: 11/694,981

(22) Filed: Mar. 31, 2007

(65) Prior Publication Data

US 2008/0239937 A1    Oct. 2, 2008

(51) Int. Cl.
*H04J 1/12* (2006.01)
*H04J 3/10* (2006.01)
(52) U.S. Cl. ........................................ 370/201; 379/417
(58) Field of Classification Search .................. 370/201, 370/241, 252, 203, 210, 286; 379/416, 417
See application file for complete search history.

(56) References Cited

U.S. PATENT DOCUMENTS

| 5,887,032 | A | 3/1999 | Cioffi | |
|---|---|---|---|---|
| 7,158,563 | B2* | 1/2007 | Ginis et al. | 375/224 |
| 2004/0047426 | A1* | 3/2004 | Nissani Nissensohn | 375/259 |
| 2006/0215689 | A1* | 9/2006 | Liu et al. | 370/465 |
| 2007/0014378 | A1* | 1/2007 | Parhi et al. | 375/267 |
| 2007/0133723 | A1* | 6/2007 | Cheong et al. | 375/346 |
| 2007/0230628 | A1* | 10/2007 | You et al. | 375/340 |
| 2007/0254607 | A1* | 11/2007 | Bandemer et al. | 455/101 |
| 2008/0001821 | A1* | 1/2008 | Tanaka | 342/417 |

OTHER PUBLICATIONS

Michael L. Honig, Pedro Crespo, & Kenneth Steiglitz, Suppression of Near- and Far-End Crosstalk by Linear Pre- and Post-Filtering, IEEE Journal on Selected Areas in Communications, vol. 10, No. 3, (16 Pages), Apr. 1992.

* cited by examiner

*Primary Examiner* — Brian D Nguyen
(74) *Attorney, Agent, or Firm* — Wood, Herron & Evans, LLP

(57) ABSTRACT

Signals in a multi-channel, impaired communication system are post-processed at the receiver. A triangular matrix Decision Feedback Demodulator (DFD) at the receiver extracts channels without requiring delivery of receiver parameters to the transmitter. Multi-Input Multi-Output (MIMO) processing matrices and DFD parameters are computed by first applying matrix transformations to diagonalize the noise covariance matrix of the multiple channels received at the receiver. QR decompositions (i.e., decompositions into orthogonal and triangular matrices) are then applied to the main channels to obtain triangular channel matrices. The noise-diagonalizing transformations and QR decompositions are then combined to form the MIMO postprocessing matrices and DFD parameters. MIMO postprocessing matrices and DFD parameters are computed from training data and then adapted during live data transmission.

20 Claims, 7 Drawing Sheets

MITIGATION OF INTERFERENCE AND CROSSTALK IN COMMUNICATIONS SYSTEMS

BACKGROUND OF THE INVENTION

The present invention relates to reducing the effects of interference from crosstalk and other noise sources that interfere with signals transmitted over wires, cable, fiber optics, wireless, or other types of communication where the signals suffer from some level of interference.

Interference generally is generated by signals from other signal sources. For example in Digital Subscriber Line (DSL) systems, interference may originate from other DSL services, in which case it is referred to as crosstalk, or from non-DSL sources such as AM radio transmitters, electrical appliances, and power supplies. Interference does not include unstructured background noise, such as thermal and environmental noise.

Interference in a signal may lead to certain limitations of a communication system. For example in wireless systems, such as cellular phones, interference may shorten the distance at which the signal can be reliably received and the clarity of the signal. As another example, in wireline systems, such as digital subscriber lines (DSL), interference may shorten the distance at which the signal can be reliably received, i.e., limit loop reach. Interference may also decrease the bit rate of the data being transferred. Providers of telecommunications services recognize the need to monitor the quality of service provided to users of their networks and to identify the causes of problems reported by their customers. This task, however, is complicated significantly by several factors.

The following discussion describes in detail many of the problems of DSL technology and potential solutions thereto. However, the discussion merely uses DSL as one example of the many communication systems (e.g., wireline, wireless, optical, cable, etc.) in which the present invention may be used. Thus the present invention should not be limited to merely DSL communication systems.

Digital Subscriber Line (DSL) networks provide high speed networking service while preserving the investment made in traditional telephone lines used for standard analog baseband telephone service, known as "plain old telephone service" or POTS. FIG. 1 shows an exemplary topology of a DSL network. In the exemplary DSL network topology 100 of FIG. 1, various customer premise equipment (CPE) modems 105, 106, 107 are communicatively coupled to a central office switching center 101 via ordinary telephone lines (e.g., lines 120 through 125).

Customer premise equipment 105, 106, 107 is equipment located at the customer's location (e.g., a customer's home or office). In the exemplary network topology 100 of FIG. 1, the customer premise equipment 105, 106, 107 possesses at least one transceiver (e.g., transceiver 108 in CPE 105) that is responsible for: 1) controlling at the CPE the reception of information sent from the service provider; and 2) controlling at the CPE the transmission of information sent to the service provider.

Information that flows in the network 100 toward the customer (e.g., toward the direction of a CPE as seen in FIG. 1) has a "downstream" direction while information that flows in the network 100 away from the customer (e.g., away from a CPE as seen in FIG. 1) has an "upstream" direction. Thus it may be said that a transceiver within a CPE is responsible for controlling at the CPE the transmission of upstream information and the reception of downstream information.

It will be appreciated that in the topology of FIG. 1, the customer premise equipment includes plural transceivers; such a topology may be applied where the bandwidth desired by a customer cannot be supplied by a single transceiver.

Various DSL service schemes exist. For example, at a high level, DSL services are characterized according to the bandwidth allocated for a customer's upstream and downstream traffic. Services that reserve approximately equal amounts of bandwidth for a customer's upstream and downstream traffic are referred to as "symmetric DSL" while services that reserve approximately unequal amounts of bandwidth for a customer's upstream and downstream traffic are referred to as "asymmetric DSL".

ISDN DSL (IDSL), High bit-rate DSL (HDSL, HDSL2, HDSL4), Symmetric DSL (SDSL), and Single-pair High-speed DSL (SHDSL) are versions of symmetric DSL. Rate Adaptive DSL (RADSL), Asymmetric DSL (ADSL, ADSL2, ADSL2+), Splitterless ADSL (G.lite), and Very high bit rate DSL (VDSL) are versions of asymmetric DSL. Any of these DSL services (as well as other potential future DSL services that are not listed above) may be referred to as "DSL" or "xDSL".

Note that the central office 101 includes a plurality of DSL Access Multiplexers 102, 103, 104 (DSLAMs). A DSLAM operates as a distributor of DSL services. That is, for example, DSLAM 102 forwards/collects downstream/upstream information sent from/to higher layers of a service provider's network to/from transceivers 108, 109, 110. The service provider's DSL network is controlled by a Network Management Agent (NMA) 118.

An NMA 118 is one or more software routines that monitor the operation of a network (e.g., by collecting various performance monitoring statistics sent from the DSLAMs 102, 103, 104) and controls various aspects of a network (e.g., by enabling or disabling service on a particular line). The NMA 118 shown in FIG. 1 monitors and controls the DSL network 100 by communicating with the DSLAMs through the Element Management Systems 116, 117 (EMSs). The NMA 118, as an example, may be executed as part of a network's Network Management System (NMS). An EMS effectively distributes to the DSLAMs control information sent from the NMA and forwards to the NMA 118 network performance or network status indicia sent from the DSLAMs. More details on a DSL system are provided below.

FIG. 2 shows a simplified depiction of an xDSL receiver Rx 201 within a DSL transceiver TRX 208. For example, transceiver 208 of FIG. 2 may be viewed as corresponding to transceiver 108 of FIG. 1 and line 220 of FIG. 2 may be viewed as corresponding to line 120 of FIG. 1. Recalling that the transceiver 208 is responsible for controlling both the transmission of upstream traffic and the reception of downstream traffic, note that receiver 201 assists the performance of the latter of these two functions.

The receiver 201 includes an equalizer 202 and a symbol detection unit 203 (which may also be referred to as a symbol detector 203). The equalizer 202 adjusts the transfer function of the receive channel such that the frequency components of the received waveform rx(t) 221 that are associated with the signal (i.e., the frequency components of the received waveform rx(t) 221 that are associated with the downstream information sent from the service provider to the transceiver 208) are enhanced with respect to the frequency components of the waveform rx(t) 221 that are not associated with the signal (i.e., the frequency components of the waveform's "noise"). It will be appreciated that the equalizer 202 may include several disparate blocks that collectively accomplish this function.

The symbol detection unit 203 converts the features of the equalized waveform 222 into digital 1's and 0's according to the modulation scheme employed by the particular type of DSL service being implemented. As a result of the equalizer's activity, the signal-to-noise ratio (SNR) in the receive channel is enhanced and the performance of the symbol detection unit 203 (i.e., its ability to correctly reproduce the digital information sent by the service provider) is improved. It will be appreciated that the symbol detection unit 203 may also include several disparate blocks that collectively accomplish this function.

Referring back to FIG. 1, note that the ordinary telephone lines such as 120, 121 and 122 that couple the DSLAMs and the CPEs are tightly packed together in a binder such as binder 114 and binder 115. Because ordinary telephone lines were originally designed for low speed voice/telephony communications, they are typically packed in a binder without shielding. That is, the lines typically comprise a simple twisted pair of wire that was originally intended to transmit only low-frequency voice signals. As a result, when used for high-frequency data transmission, these twisted pairs are not adequately protected from receiving high-frequency electromagnetic interference associated with the waveforms that appear on another line; nor are the waveforms on a line prevented from radiating so as to interfere with the waveforms that appear on another line.

For example, FIG. 3 illustrates a binder 308, which may be understood to correspond to the binders 114, 115 etc. shown in FIG. 1, having twisted pairs 306-1 through 306-N, which may be understood to correspond to the individual lines 120, 121 and 122 of FIG. 1. Pair 306-1 may be expected to experience more crosstalk from a pair 306-2 closer to it than more distant 306-L. Likewise, pair 306-2 located on the perimeter of the bundle 308 may experience different crosstalk than a pair 306-M more toward the center of the bundle 308. Additionally, if pair 306-1 had previously been the only pair being utilized for DSL service, but thereafter pair 306-2 was placed into DSL service, there may be new crosstalk due to this activation. Also the type of DSL service (i.e., ADSL, SHDSL, etc.) may have an effect on crosstalk. In general, each DSL service type occupies a band limited frequency region. If pairs in proximity to each other are conveying information in different frequency bands, then there may be less crosstalk between them than between pairs conveying information in the same frequency band.

Crosstalk may corrupt the operation of the symbol detection unit 203 discussed above with respect to FIG. 2. Crosstalk typically increases as the frequencies of the waveforms on an ordinary telephone line increase. Crosstalk is typically viewed as consisting of (1) Near-End Crosstalk (NEXT), caused by transmitters located at the "near-end", i.e., on the same side (network side or customer side) of the connection as the receiver experiencing the interference, and (2) Far-End Crosstalk (FEXT), caused by transmitters located at the "far-end", i.e., on the opposite side of the connection from the receiver experiencing the interference.

When the ordinary telephone lines were originally installed to carry POTS voice traffic, crosstalk was insubstantial because of the lower frequencies used to transmit voice traffic. In particular, the twisting of the two wires to form pairs such as the pairs 306 shown in FIG. 3, was designed to adequately protect against crosstalk interference from other twisted pairs at these low frequencies. However, as DSL is designed to provide higher speed services (as compared to traditional telephony service) over these ordinary telephone lines, DSL waveforms contain much higher frequencies, at which the twisting of the wires does not provide adequate protection. As a result, crosstalk from DSL waveforms is much more severe. The more severe crosstalk frequently hampers the successful deployment of a DSL service. The only way to substantially reduce this crosstalk is to replace the billions of existing copper pairs with shielded copper pairs, or other media such as optical fiber, which may not be economically feasible in many environments.

In view of the difficulties described above, there have been efforts to utilize signal processing techniques to improve communications in noisy and impaired channels such as DSL over telephone lines. Specifically, U.S. Pat. No. 6,970,415, assigned the assignee of this application and incorporated by reference herein, describes a method for characterizing and identifying crosstalk interference sources in a DSL or similar communication environment. U.S. Pat. No. 6,834,109, also assigned to the assignee of this application and incorporated by reference herein, describes a method for compensating for crosstalk interference by estimating and compensating for the presence of interfering signals. These methods may be implemented in a single DSL receiver to reduce the effect of crosstalk from other DSL services, and are therefore relevant even to residential DSL services which are typically delivered using a single copper pair.

Another way to increase the data throughput rates of services delivered to DSL customers is to use multiple copper pairs for a single customer. This process is called "bonding", and it involves breaking up a data stream into multiple smaller data streams that are transmitted using multiple transmitters over multiple copper pairs, then received at the other end using multiple receivers, and finally reassembled back into the original larger data stream. Bonding of multiple lines, i.e., multiple copper pairs, is typically used to deliver services to business customers who often require higher data rates, especially in the upstream direction, than residential DSL customers. Such is illustrated in FIG. 1, as noted above.

When utilizing multiple lines for bonded services, it is possible to reduce the detrimental effects of crosstalk interference by coordinating the signals received in the receivers connected to those multiple lines. In that case, one may distinguish between two types of crosstalk:

1. "Self-crosstalk", which consists of Self-NEXT and Self-FEXT, originates from transmitters connected to other lines of the same multiline connection, also referred to as "in-domain" transmitters and "in-domain" lines, respectively.
2. "Alien crosstalk", which consists of Alien NEXT and Alien FEXT, originates from transmitters connected to lines that are not part of the same multiline connection, also referred to as "out-of-domain" transmitters and "out-of-domain" lines, respectively.

Self-NEXT can be dealt with in a straightforward manner, because the signals of the interfering transmitters are known and thus their effect can be cancelled from the affected receivers. This cancellation is based on identifying the precise filter that has to be applied to the interfering transmitted signal to match the exact opposite of the interference signal at the affected receiver. The principle is the same as that used for echo cancellation in single-line transceivers, but in this case it involves additional complexities associated with a full matrix of crosstalk cancellation filters. The resulting "matrix echo canceller" contains filters that characterize the interference channels from each of the multiple near-end transmitters to each of the multiple near-end receivers.

The mitigation of Alien interference, which includes Alien crosstalk from out-of-domain transmitters, and also noise from non-DSL signal sources, is more challenging, since the in-domain receivers do not have access to the signals of the interfering out-of-domain transmitters or non-DSL signal sources. Nevertheless, addressing the problem of Alien interference is essential to achieving higher bitrates in a multiline system. Without it, Self-NEXT cancellation is of limited benefit, since there is no guarantee that the in-domain component of the interference will be stronger than the out-of-domain or non-DSL component.

Published PCT patent application WO 2003/105339, also assigned to the assignee of this application and incorporated by reference herein, describes a method for mitigating the effects of Alien interference by identifying its spectral signature matrix across multiple receivers, and then pre-whitening the received noise signal across these multiple receivers through the application of an appropriate pre-processing matrix to the outgoing signals prior to transmission, and of the corresponding post-processing matrix to the received signals before decoding them. In addition, the aforementioned patent application describes a method for eliminating Self-FEXT by using a matrix receiver filter that characterizes the transmission channels from each of the multiple far-end transmitters to each of the multiple near-end receivers. Thus, each of the multiple near-end receivers utilizes the signals from each of the multiple far-end transmitters, and the signal component that would ordinarily be considered Self-FEXT actually becomes part of the received signal.

The methods that have been disclosed in the aforementioned patents can be generally characterized as Multi-Input, Multi-Output (MIMO) processing techniques. In the case of PCT patent application WO 2003/105339, these techniques are applied to both the far-end transmitters and the near-end receivers in a system of multiple copper pairs impaired by noise and crosstalk. A disadvantage of using MIMO techniques on both transmitter and receiver is the need to establish special communication methods between the transmitter and receiver so that the MIMO processing at transmitter and receiver may be coordinated as the channel interference is modeled and managed. Specifically, the receiver must compute MIMO matrix parameters to optimize the overall channel transfer function, and then deliver those parameters to the transmitter to implement the MIMO system. A large number of parameters must be transmitted, and the additional channel of communication needed for delivery of these parameters may require approval by the appropriate DSL standards bodies.

SUMMARY OF THE INVENTION

The present invention provides a method and system for MIMO processing that overcomes these drawbacks of above-referenced prior art patents while achieving similar levels of improvement in data rates.

Specifically, in accordance with the invention, the mitigation of Alien interference is achieved through processing of signals transmitted and received over a multiline communication system only at the near-end receivers of such a system, and does not require corresponding pre-processing at the far-end transmitters.

Specifically, a noise pre-whitening matrix is combined with a triangular matrix Decision Feedback Demodulator (DFD) at the receiver to extract signals at a performance level similar to that accomplished in the prior art, without requiring delivery of receiver parameters to the transmitter.

In the specific disclosed embodiment, MIMO processing matrices and DFD parameters are computed by first applying matrix transformations to pre-whiten noise of the multiple channels received at the receiver. A QR decomposition (i.e., a decomposition into an orthogonal matrix and a triangular matrix) is then applied to the main channels to obtain triangular channel matrices. The pre-whitening transformations and QR decompositions are then combined to form the MIMO postprocessing matrices and DFD parameters.

In this disclosed embodiment, MIMO postprocessing matrices are computed from training data. The MIMO postprocessing matrices are then adapted during showtime, i.e., during live data transmission.

In another aspect, the invention features a data communication appliance which transfers communications data over a plurality of twisted copper pairs, such as are frequently available at business buildings or private homes which are wired for multiple telephone lines. A multiline processor connected to the twisted copper pairs extracts multiple different channels from the plural twisted pair signal paths, such as voice, POTS, video, video broadcast, pay-per-view video, and internet data. The use of dual twisted pair signal paths permit wideband service from, e.g. incumbent local exchange carriers, permitting effective competition with cable television providers.

DETAILED DESCRIPTION

Figure 1:
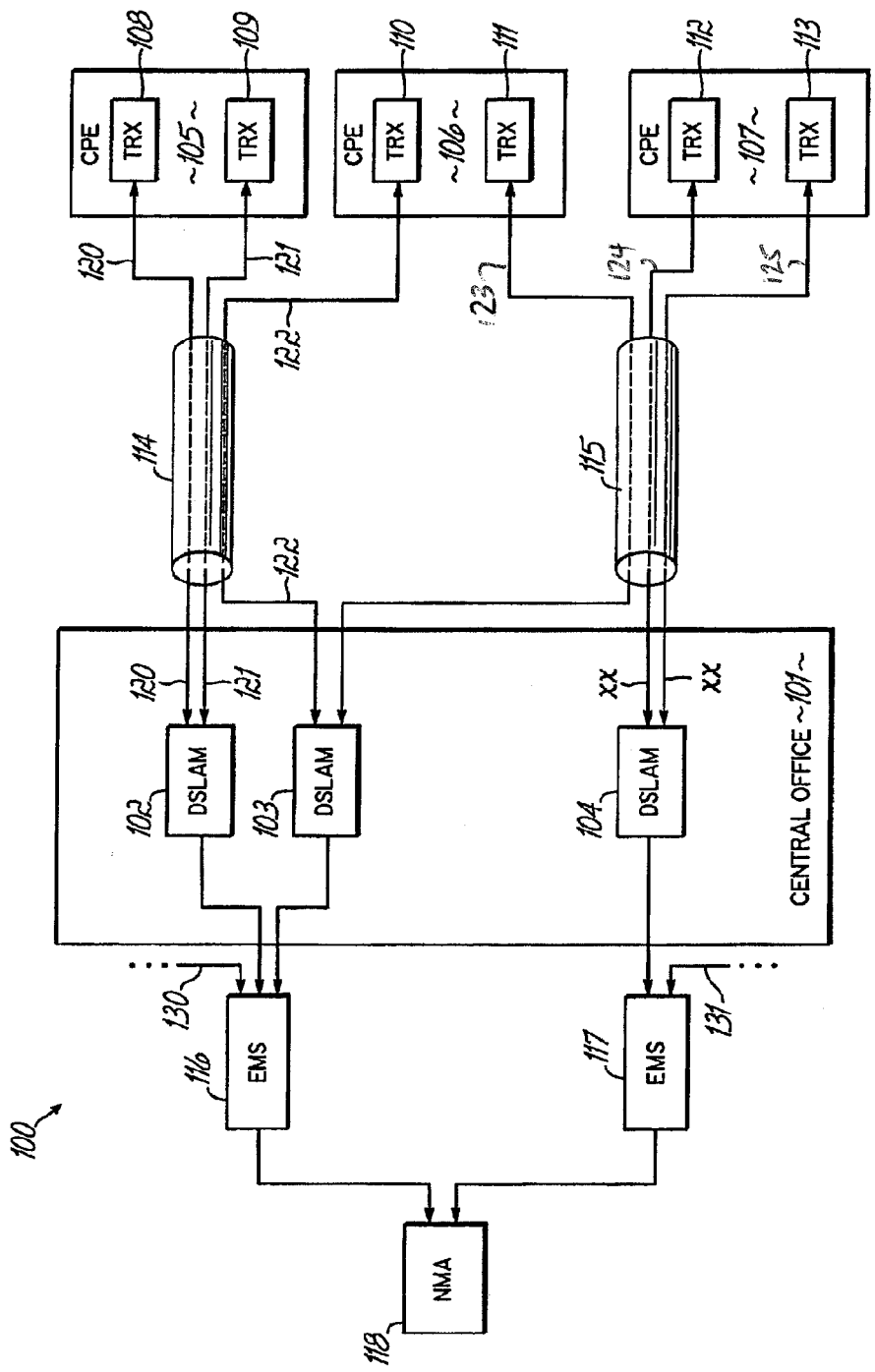
FIG. 1 is a system diagram of an xDSL communication system suitable for application of the invention.
Figure 2:
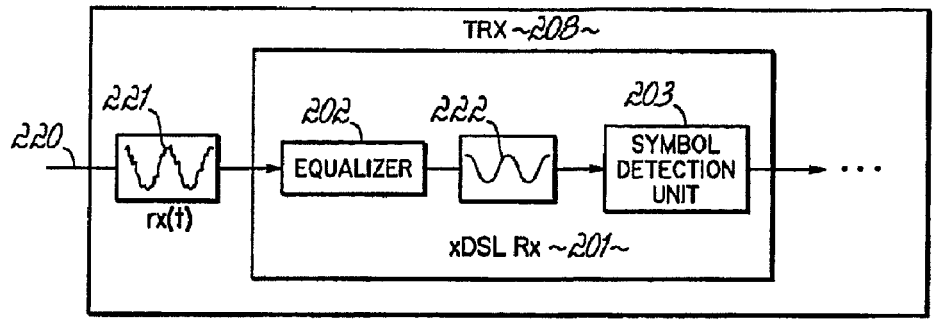
FIG. 2 is a simplified block diagram of an xDSL receiver in the communication system of FIG. 1.
Figure 3:
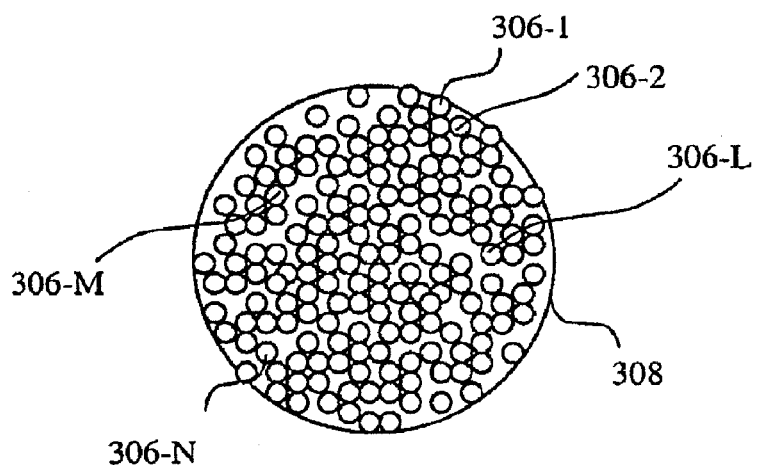
FIG. 3 is a cross-sectional view of a binder carrying a plurality of twisted pair lines each used as a channel for xDSL service and/or POTS service.

For purposes of discussing and illustrating the invention, several examples of the invention will now be given in the context of a wireline communication system, such as xDSL. However, one skilled in the art will recognize and appreciate that interference, for example, crosstalk, is a problem in wired and wireless communications and that the techniques disclosed are applicable in these areas as well.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The acts described require physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The invention presented herein is not inherently related to any particular apparatus. Various general purpose systems may be used with suitable programming in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of a mathematical expression. That is, while the technique may be, for example, implemented as executing code on a computer, the expression of that technique may be more aptly and succinctly conveyed and communicated as a formula or mathematical expression. Thus, one skilled in the art would recognize a block denoting $A+B=C$ as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 4:
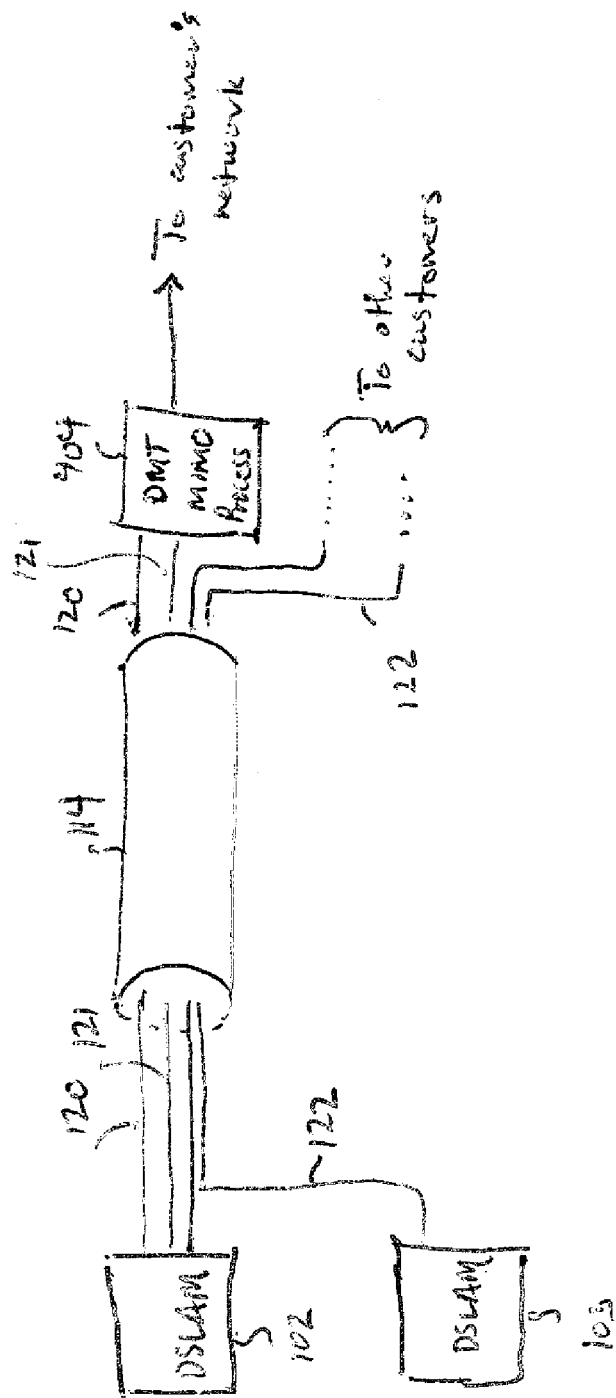
FIG. 4 is a block diagram illustrating the inclusion of MIMO pre-processing and post-processing blocks in an xDSL communication system such as that of FIG. 1.

Referring now to FIG. 4, an implementation of principles of the present invention can be illustrated in the context of a discrete multitone (DMT) modulation system, in which post-processing is used at a receiver. The premise of the present invention is to provide crosstalk reduction without preprocessing in block 402.

Figure 5:
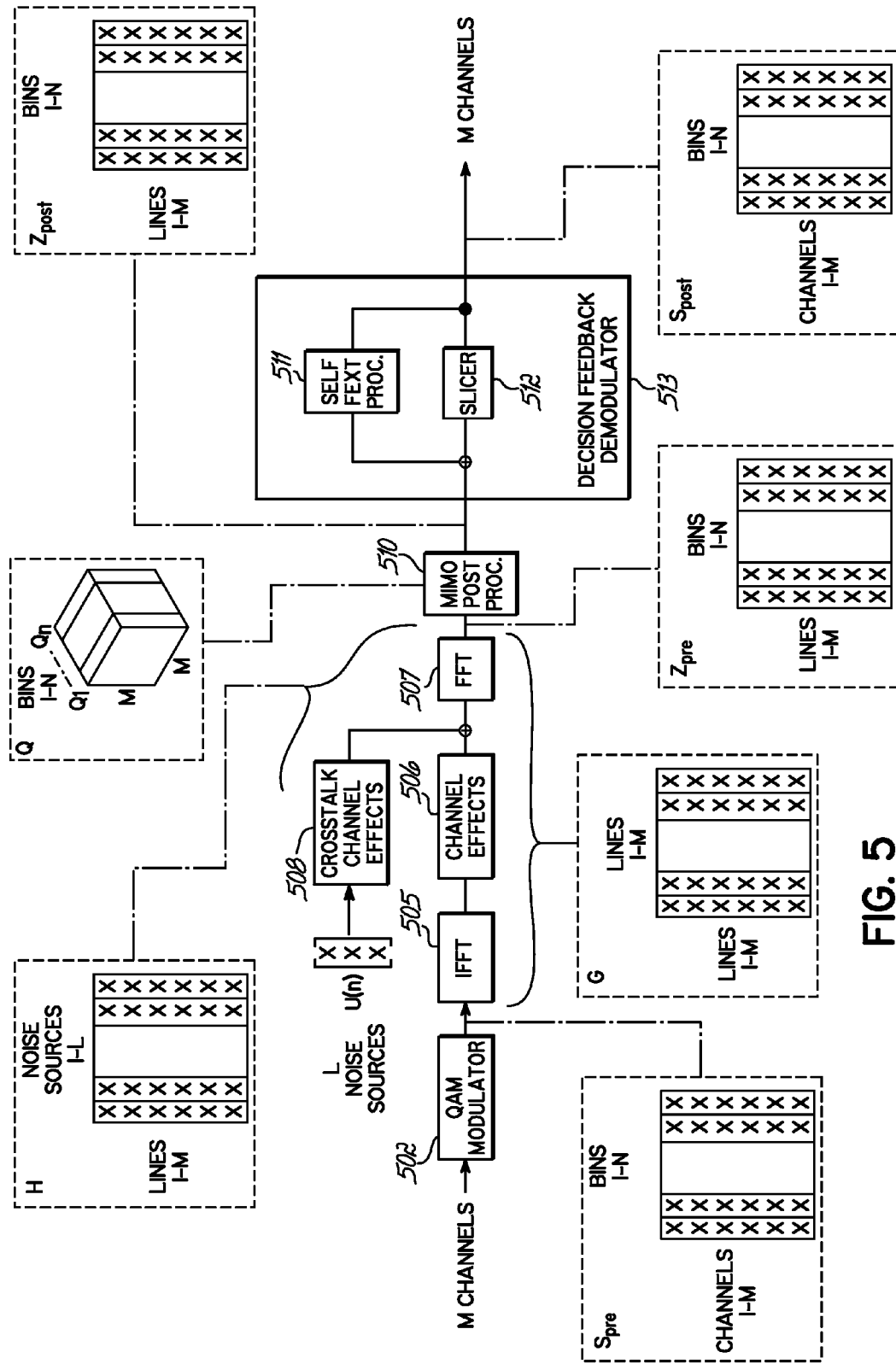
FIG. 5 is a block diagram and process flow diagram detailing the MIMO pre-processing and post-processing blocks of FIG. 4 in accordance with principles of the present invention.

Details of the DMT/MIMO system in accordance with the present invention are illustrated in FIG. 5. As is conventional in DMT techniques, M incoming data signals are delivered to a quadrature amplitude modulation block 502. The frequency-domain output of block 502 is converted to time domain (waveform) information by an Inverse Fast Fourier Transform (IFFT) block 505. Data is then transmitted in this format to the receiver section, where it is received by a Fast Fourier Transform (FFT) block 507, and then delivered to a MIMO Postprocessor 510 (which may contain a frequency domain equalizer (FEQ) or other equalizer) and then to a Decision Feedback Demodulator (DFD) 513.

MIMO Postprocessor 510 is logically located between the FFT and the DFD, and performs two functions:
 requency-domain equalization (FEQ); and
 Diagonalization of the noise covariance matrix as measured across channels (MIMO postprocessor) to reduce the effects of Alien interference.

A byproduct of the second effect of the MIMO Postprocessor 510, namely the diagonalization of the noise covariance matrix, is that the signals from different transmitters become "intertwined" or "tangled" at the output of MIMO Postprocessor 510. Therefore, instead of using just a slicer to generate the received symbols, a Decision Feedback Demodulator 513 is used, which consists of a feedback configuration which has:

In the forward path a Slicer 512 whose output are the received symbols, i.e., the decisions; and In the feedback path a Self-FEXT Processor 511 that uses the decisions from some parts of the Slicer 512 to "untangle" the signals from different transmitters, and, in the process, cancel the effects of Self-FEXT from other far-end transmitters of the multiline system.

The MIMO Postprocessor 510 takes a block of input once each DMT symbol period. The data block, denoted $Z_{pre}$, consists of an $M_{line} \times N_{bin}$ complex matrix, illustrated in FIG. 5. Each element of the matrix is a complex value point. For a given frequency bin i, the vector $Z_{pre}(:,i)$ represents complex values from all physical channels for that bin.

The MIMO Postprocessor 510 produces a block of output once each DMT symbol period. The data block, denoted $Z_{post}$, consists of an $M_{line} \times N_{bin}$ complex matrix. Each element of the matrix $Z_{post}$ is a complex constellation point. For a given frequency bin i, the vector $Z_{post}(:,i)$ represents the output constellation points from all channels for that bin.

The MIMO Postprocessor 510 uses an adjustable parameter block. The parameter block, denoted Q, consists of an $M_{line} \times M_{line} \times N_{bin}$ complex matrix, illustrated in FIG. 5. For one embodiment, a given frequency bin i, the $M_{line} \times M_{line}$ matrix $Q(:,:,i)$ is a complex matrix that performs both the frequency equalization FEQ and the MIMO Postprocessor functions. In other embodiments, FEQ (and TEQ) may not be used, but other techniques may be used in their place, such as per-tone equalization; in that case, the MIMO Postprocessor would still exist, and the invention would be applicable.

When the system is first turned on, the parameter block Q consists of the set of identity matrices $Q(:,:,i)=I$ for all i. If an FEQ is implemented, after the completion of FEQ training, the identity matrices are replaced with FEQ matrices $Q(:,:,i)$. At the end of MIMO crosstalk cancellation training, the matrices $Q(:,:,i)$ are modified to perform both the FEQ and MIMO Postprocessor functionality.

The matrices $Q(:,:,i)$ are adapted to track changes in the main channels and in the noise environment during showtime.

For each symbol, the MIMO Preprocessor block implements for all bins i the expression:

$$Z_{post}(:,i)=Q(:,:,i)Z_{pre}(:,i) \quad (2)$$

The MIMO Postprocessor block 510 has no internal states that must be maintained between symbols. The parameters (Q in the MIMO Postprocessor block) include $2M_{line}^2 N_{bin}$ real scalar values. (For the reason that each element in these $M_{line} \times M_{line} \times N_{bin}$ matrices is a complex number that consist of 2 real scalar values, one representing the real part and the other representing the imaginary part, or one representing the amplitude and the other representing the phase of the complex number.)

A basic real multiply and real add count is as follows:
A total of $N_{bin}$ complex matrix-vector multiplies must be performed to implement Expression (1) or Expression (2) above once per symbol.
Each complex matrix-vector multiply consists of $M_{line}^2$ complex vector inner products.
Each complex vector inner product requires $M_{line}$ complex multiplies and $(M_{line}-1)$ complex accumulates.
Each complex multiply requires 4 real multiplies and 2 real accumulates.
Each complex accumulate requires 2 real adds.

Thus, Expression (1) and Expression (2) each require $4N_{bin} M_{line}^3$ real multiplies and $4N_{bin} M_{line}^2(M_{line}-1)$ real accumulates per DMT symbol.

With the preceding framework, the functions of MIMO post-processing in block 510 and DFD demodulation in block 513 may be explained. To do so, a model will be introduced for the aspects of the communications channels that are to be treated by the MIMO post-processing and DFD demodulation.

FIG. 5 illustrates blocks 505, 506 and 507 which model the crosstalk in all channels of the system. The model for the collective effects of the channels is a complex matrix $G(:,:,i)$, an $M_{line} \times M_{line}$ matrix that models the effects of the following:

The IFFT 505, prefixing, and AFE in the transmitter
The effects of the copper loop plant represented by block 506
The receiver AFE, TEQ, windowed deprefixing, and FFT 507 in the receiver To model noise, a signal $u(:,i,n)$ is generated, comprised of a collection of unit variance white Gaussian (AWGN) noise sources. A matrix $H(:,:,i)$ models correlation in these sources to create a correlated vector noise signal $H(:,:,i)u(:,i,n)$ that impairs transmission on the system. By appeal to the Central Limit Theorem it may be asserted that this is a reasonable model of the combined effects of crosstalk from other services, AFE circuit noise, and other (approximately) stationary impairments that limit the achievable data rate.

In the following discussion, the bin index "i" and index placeholder ":" notation are eliminated for simplicity of reference. Thus, the expression $H(:,:,i)u(:,i,n)$ becomes $Hu(n)$. In addition, "$M_{line}$" is replaced with the quantity "m" when necessary. Using this more compact notation, the model of the channel, FFT, IFFT and related effects shown in FIG. 5 may be represented by the expression $$Z_{post}(n)=QGS_{pre}(n)+QHu(n) \quad (3)$$

Where Q is the post-processing MIMO matrix, G is the channel model, and H is the noise correlating model. If we now consider transmitted signal vectors $S_{pre}(n)$ that consist of independent scalar signals with equal power, the central objective of MIMO DFD processing may be stated as follows:

Given a particular pair of matrices G and H, choose a matrix Q so that the system has the following two properties:
(P1) The main channel matrix QG is upper triangular and has ones on its diagonal.
(P2) The matrix Q diagonalizes the covariance of the noise signal $QHu(n)$.

Note that there is no required preprocessing at the transmitter for the desired solution, a substantial advance over the systems noted in the prior art in which pre-processing and the resulting delivery of parameters to the transmitter may be difficult to implement.

The following describes a multi-step method to satisfy the requirements set forth above.

Consider first the covariance of $Hu(n)$, which is $$C=E[Hu\,u^H H^H]. \quad (4)$$

Let us define the matrix $C^{1/2}$ as the Cholesky factorization of the matrix C. Thus, we can whiten the correlated noise added to the M channels by premultiplying $Hu(n)$ by $C^{-1/2}$ so that $$E[C^{-1/2}Huu^H H^H C^{-H/2}]=C^{-1/2}CC^{-H/2}=I. \quad (5)$$

Thus by choosing the postprocessing matrix Q to equal our newly identified matrix $C^{-1/2}$, the right addend in (3) will be whitened noise, and the left addend in (3) will become the pre-multiplication of $S_{pre}$ by $C^{-1/2}G$. To analyze this addend, compute the well-known "QR" decomposition of the matrix $C^{-1/2}G$:

$$UW = C^{-1/2}G \text{ where} \quad (6a)$$

$$U^H U = UU^H = I \text{ and} \quad (6b)$$

$$W = \begin{bmatrix} w_{11} & \cdots & w_{1m} \\ & \ddots & \vdots \\ 0 & & w_{mm} \end{bmatrix} \text{ is upper triangular.} \quad (6c)$$

(Note that in some applications a frequency-domain equalizer (FEQ) may be employed immediately following the FFT in the receiver. In this case, the matrix G will be the identity. As a result, $C^{-1/2}G=C^{-1/2}$, which is already upper triangular. This case obviates the need to compute the QR decomposition and for that case we may set U=I in the following discussion.)

We now define the diagonal matrix D to be $$D = \begin{bmatrix} w_{11}^{-1} & & \\ & \ddots & \\ & & w_{mm}^{-1} \end{bmatrix} \quad (7)$$

We then set the matrix Q to be $$Q = DU^H C^{-1/2} \quad (8)$$

Let us now verify that Expression (8) solves the MIMO DFD Processing problem. We verify Property (P1) by substituting Expression (8) into Expression (6a) so that $$\begin{aligned} QGP &= DU^H C^{-1/2} G \\ &= DU^H UW \\ &= DW \\ &= \begin{bmatrix} w_{11}^{-1} & \cdots & w_{11}^{-1} w_{1m} \\ & \ddots & \vdots \\ & & w_{mm}^{-1} w_{mm} \end{bmatrix} \\ &= \begin{bmatrix} 1 & \cdots & w_{11}^{-1} w_{1m} \\ & \ddots & \vdots \\ & & 1 \end{bmatrix} \end{aligned} \quad (9)$$

We verify Property (P2) as follows:

$$\begin{aligned} E[DU^H C^{-1/2} Huu^H H^H C^{-H/2} UD^H] &= DU^H UD^H \\ &= DD^H \\ &= \begin{bmatrix} w_{11}^{-2} & & \\ & \ddots & \\ & & w_{mm}^{-2} \end{bmatrix} \end{aligned} \quad (10)$$

The solution to the MIMO Processing Problem can now be stated concisely:
(1) Find the matrices G and $C^{-1/2}$
(2) Compute the matrices U and R defined in Expressions (6a-c)
(3) Compute the matrix D defined in expression (9).
(4) Set $Q = DU^H C^{-1/2}$ The first step of this solution is to find the matrices G and $C^{-1/2}$. This is accomplished by system training, which is done in two phases.

The FEQ or other equalization function of the MIMO Postprocessor block 510 is trained first, using a training methodology analogous to standard DMT training.

After the equalization function it put in place, the noise environment is profiled via a training methodology analogous to standard DMT MEDLEY training. This training phase is used to compute parameters for the MIMO Postprocessor block 510 and to obtain signal to noise ratios (SNRs) for bit allocation.

In the following exemplary discussion, the first phase will be identified as "FEQ Training" and the second phase as "MIMO Training."

FEQ Training

To perform FEQ training, $M_{line}$ different "experiments" are performed. During these experiments, the parameter block Q is the set of identity matrices Q(,:,i)=I for all i. Each experiment consists of a single symbol of data that is repeated many times.

For the kth experiment, the FEQ training algorithm obtains two data sets:
$S_{pre}$, the sent symbol that is repeated many times
$Z_{ave}$, the average output of the FFT block 507 for all data sets, as determined by a Frequency Domain Averager (not shown)

The experiments conducted may include the following:
One sequence, repeated across lines, with sign changes
Training with or without a prefix (In training, the first few symbols of data are discarded to let transients die.) The FEQ Training process produces a new MIMO Postprocessor parameter block Q. To compute Q, the FEQ Training algorithm computes an estimate of the channel model matrix G(:,:,i) for each bin i. This block of channel estimates is denoted G and indexed the same way as Q.

The FEQ Training Algorithm computes the elements of the parameter block Q using the results of the $M_{line}$ different experiments. The parameter block Q is computed bin by bin. As in the sections above, the portion of the block that corresponds to the ith bin is denoted Q(:,:,i).

To avoid confusion in the following, we denote the parameter block computed by the FEQ Training algorithm $Q_{FEQ}$(:,:,i)

For each bin i, the FEQ Training input data is collected into the two $M_{line} \times M_{line}$ matrices $[S_{pre}(:,I,1) \ldots S_{pre}(:,i,M_{line})]$ and $[Z_{ave}(:,i,1) \ldots Z_{ave}(:,i,M_{line})]$. The corresponding FEQ/MIMO Postprocessor parameter block $Q_{FEQ}$(:,:,i) is calculated via the expression $$Q_{FEQ}(:,:,i) = [Z_{ave}(:,i,1) \cdots Z_{ave}(:,i,M_{line})]^{-1} \quad (11)$$
$$[S_{pre}(:,i,1) \cdots S_{pre}(:,i,M_{line})]$$

If needed by other blocks, the channel matrix estimate $\hat{G}(:,:,i)$ is computed via the formula $$\begin{aligned} \hat{G}(:,:,i) &= Q_{FEQ}^{-1}(:,:,i) \\ &= [Z_{ave}(:,i,1) \cdots Z_{ave}(:,i,M_{line})] \\ &\quad [S_{pre}(:,i,1) \cdots S_{pre}(:,i,M_{line})]^{-1} \end{aligned} \quad (12)$$

Decision Feedback Demodulator (DFD)

In this section we describe a method to demodulate the received signal $Z_{post}(n)$ and indicate how the properties of $S_{pre}(n)$ (e.g., the sent power, constellation structure, etc.) may be set. First, consider the transmission system described by Expression (3). With MIMO Postprocessing defined as above, the system for the ith bin looks like $$Z_{post}(n) = DWS_{pre}(n) + v(n) \qquad (13)$$
$$= \tilde{W}S_{pre}(n) + v(n)$$

where $\tilde{W} = DW$ and $$Z_{post}(n) = [z_1(n) \ldots z_m(n)]^T, \qquad (14a)$$

$$S_{pre}(n) = [s_1(n) \ldots s_m(n)]^T, \qquad (14b)$$

$$v(n) = QHu(n) = [v_1(n) \ldots v_m(n)]^T, \qquad (14c)$$

$$DW = \begin{bmatrix} 1 & \cdots & w_{11}^{-1}w_{1m} \\ & \ddots & \vdots \\ & & 1 \end{bmatrix} \qquad (14d)$$

$$= \begin{bmatrix} 1 & \cdots & \tilde{w}_{1m} \\ & \ddots & \vdots \\ & & 1 \end{bmatrix}$$

with $$\tilde{w}_{jk} = w_{jj}^{-1} w_{jk}, \text{ and}$$

$$E[vv^H] = E[QHuu^H H^H Q^H] \qquad (14e)$$

$$= \begin{bmatrix} w_{11}^{-2} & & \\ & \ddots & \\ & & w_{mm}^{-2} \end{bmatrix}$$

We introduce notation for the "slice" operation as follows: The slicing operation is represented by the function $\hat{s} = \text{slice}(\cdot)$. If a received value $z(n)$ is correctly sliced, then the output of the function recovers the corresponding sent value $s(n)$. That is, $$\text{slice}(z(n)) = \hat{s}(n) = s(n) \qquad (15)$$

The Decision Feedback Demodulator (DFD) leverages the triangular structure of the matrix DW as follows. The jth row of the matrix Expression (13) is given by the expression $$z_j(n) = s_j(n) + \tilde{w}_{j(j+1)} s_{j+1}(n) + \ldots + \tilde{w}_{jm} s_m(n) + v_m(n) \qquad (16)$$

We start by slicing the mth output and working backwards as follows:

$$\hat{s}_m(n) = \text{slice}(z_m(n))$$

$$\hat{s}_{m-1}(n) = \text{slice}(z_{m-1}(n) - \tilde{w}_{(m-1)m} \hat{s}_m(n))$$

$$\ldots$$

$$\hat{s}_1(n) = \text{slice}(z_1(n) - \tilde{w}_{12} \hat{s}_2(n) - \ldots - \tilde{w}_{1m} \hat{s}_m(n)) \qquad (17)$$

Consider now the expression for $\hat{s}_j(n)$:

$$\hat{s}_j(n) = \text{slice}(z_j(n) - \tilde{w}_{j(j+1)} \hat{s}_{j+1}(n) - \cdots - \tilde{w}_{jm} \hat{s}_m(n)) \qquad (18)$$
$$= \text{slice}(s_j(n) + \tilde{w}_{j(j+1)} s_{j+1}(n) + \cdots + \tilde{w}_{jm} s_m(n) + v_m(n) - \tilde{w}_{j(j+1)} \hat{s}_{j+1}(n) - \cdots - \tilde{w}_{jm} \hat{s}_m(n))$$

If the slice operations are correct for $\hat{s}_{j+1}(n)$ through $\hat{s}_m(n)$, then we can substitute the sent values for the sliced values. Expression (14) thus collapses to $$\hat{s}_j(n) = \text{slice}(s_j(n) + v_j(n)) \qquad (19)$$

Thus, for each j, the variance $w_{jj}^{-1}$ of the noise $v_j(n)$ can be used to set the properties of the sent signal $\hat{s}_j(n)$.

One property of the DFD is that the decision made at each slice is dependent on the previous slices. Therefore if $\hat{s}_j(n)$ is incorrect, the $\hat{s}_k(n)$ is likely to be incorrect for $k < j$. Typically, however, the DFD operates in regimes where the error rate is already extremely small and since errors in the DFD are compartmentalized within frequency bins, error propagation is not catastrophic. Nevertheless, it is possible to reduce the sensitivity to error propagation by introducing error correcting codes (ECC) at the slicer level. Examples of such codes are Trellis Codes and Reed Salomon Codes. At each decision $\hat{s}_j(n)$ an ECC is applied before propagating that decision to the next slice $\hat{s}_{j-1}(n)$.

MIMO Training

To configure the MIMO DFD system, two quantities, G and $C^{-1/2}$, are needed. As described above, an estimate $\hat{G}$ of G is available at the end of FEQ training. During MIMO training, the MIMO postprocessing matrix is set to be $Q = Q_{FEQ} = \hat{G}^{-1}$, as available from Expression (12) above. The covariance of the noise with $Q_{FEQ}$ is denoted by $C_{FEQ}$ and is given by the expression $$C_{FEQ} = E[Q_{FEQ} Huu^H H^H Q_{FEQ}^H] = E[\hat{G}^{-1} Huu^H H^H \hat{G}^{-H}]. \qquad (20)$$

Clearly, C can be recovered from $C_{FEQ}$, which is measured during MIMO training, by the expression $$C = E[Huu^H H^H] = E[GG^{-1} Huu^H H^H G^{-H} G^H] = GC_{FEQ} G^H. \qquad (21)$$

An estimate $\hat{C}_{FEQ}$ of the quantity $C_{FEQ}$ is available at the end of MIMO training. This can be used to compute $\hat{C}$ from $\hat{C}_{FEQ}$ via the expression $\hat{C} = \hat{G} \hat{C}_{FEQ} \hat{G}^H$. With these quantities in hand, the solution to the MIMO Processing Problem may be computed in the manner stated above following Expression (10).

The variances of the noise that appears in slicing operations are given by Expression (14e) and are used to compute the SNR for each slicer and set its bit allocation.

Adapting the MIMO System

The MIMO parameters of the system are, as noted above, adaptable in the face of a changing noise environment or main channel matrix.

The FEQ error and covariance estimation operates on a bin by bin basis. When training data for the ith bin becomes available, the algorithm takes the following inputs:

$S_{train}(:,k)$ The training data sent on the ith bin by the opposite OTU transmitter $Z_{post}(:,i)$ The received data that corresponds to the sent training data $\Delta_{old}(:,:,i)$ The previous FEQ error estimate for the ith bin $R_{old}(:,:,i)$ The previous noise covariance estimate for the ith bin The estimation algorithm produces the following outputs:

$\Delta_{new}(:,:,i)$ The updated FEQ error estimate for the ith bin $R_{new}(:,:, i)$ The updated noise covariance estimate for the ith bin The estimation update is computed from the expressions:

$$e = Z_{post} - (\tilde{W} + \hat{\Delta}_{old}) S_{train} \qquad (22a)$$

$$\hat{\Delta}_{new} = \hat{\Delta}_{old} + \mu e S_{train}^H \qquad (22b)$$

$$[|\$]\$\hat{\$\$}[|\$]\$\hat{A}\hat{T}\hat{C}_{new} = (1-\alpha)[|\$]\$\hat{\$\$}[|\$]$$
$$\$\hat{A}\hat{T}\hat{C}_{old} \alpha e e^H \qquad (22c)$$

Here, $[|\$]\$\hat{\$\$}[|\$]\$\hat{A}\hat{T}\hat{C}$ is an estimate of $\tilde{C}$, the covariance of the noise at the output of the system. Similarly, $\hat{\Delta}$ is an estimate of $\Delta$, the difference between the actual main channel and the main channel assumed when P and Q were set.

The foregoing expressions contain two adjustable parameters:

μ, the LMS gain parameter for the FEQ error update Expression (22b)

α, the lowpass filter parameter for the covariance update Expression (22c).

These parameters may be set during product development and not changed in the field.

Figure 6:
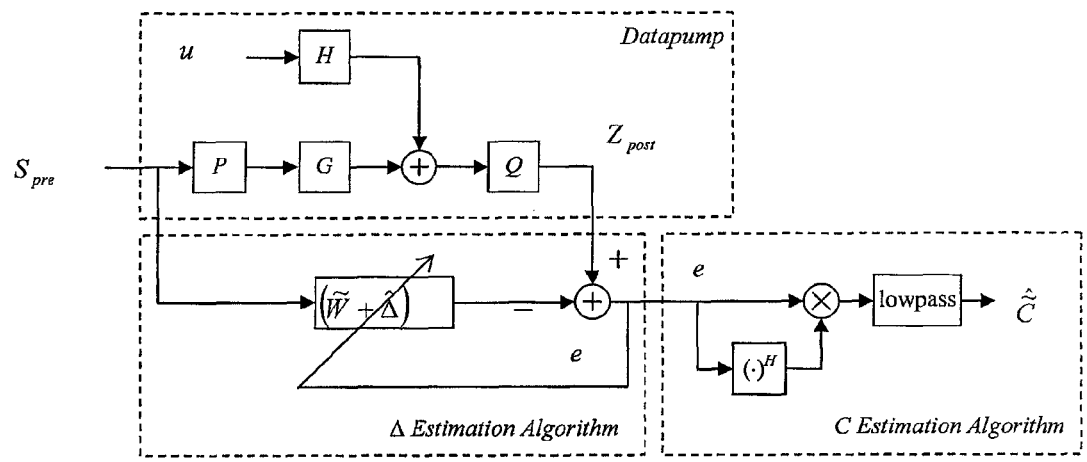
FIG. 6 is a block diagram illustrating the process for adaptation of the parameter matrices used in the system of FIG. 5 during data transmission.

Referring now to FIG. 6, a block diagram of the computations performed by Expressions (22a) through (22c) is provided.

Figure 7:
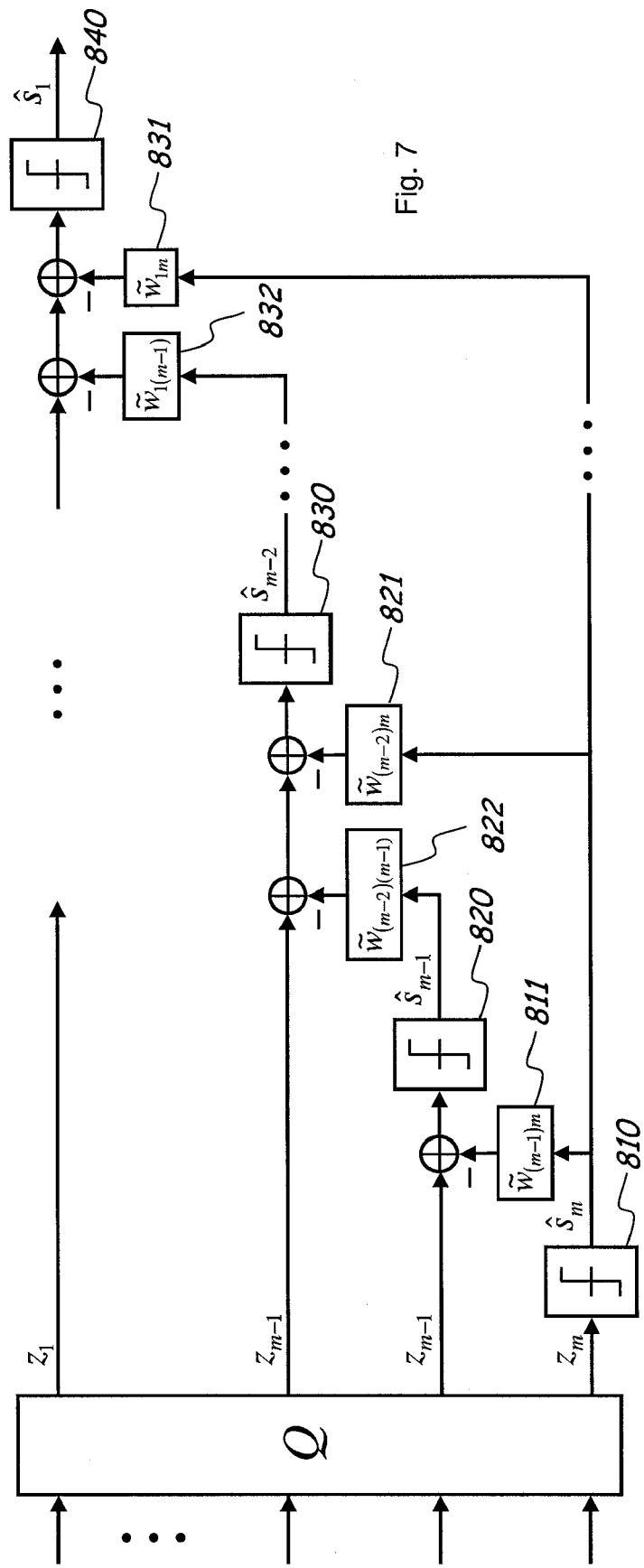
FIG. 7 is a block diagram illustrating postprocessing of received signals at the near-end receivers in accordance with principles of the present invention.

Referring now to FIG. 7, a graphical representation of Equation 17 shows the sequential processing of received signals $z_1$ through $z_m$ to generate the sliced values $\hat{s}_1$ through $\hat{s}_t$, which represent the receiver's best estimate of the transmitted symbols $s_1$ through $s_m$ that make up the transmitted symbol vector $S_{pre}$ (as illustrated in FIG. 5). The filter coefficients 811, 821, 822, 831, and 832 represent elements of the Self-FEXT Processor 511 of FIG. 5, while the slicers 810, 820, and 830 represent elements of the Slicer 512 of FIG. 5. As can be seen in FIG. 7, the output $\hat{s}_1$ of the slicer 810 is multiplied by the filter coefficients 811, 821, and 831 (among others), and the results of those multiplications are subtracted from the inputs to the slicers 820, 830, and 840 (among others), respectively, in order to "untangle" the transmitted signals and remove the effects of Self-FEXT from the other far-end transmitters. This is compactly illustrated in FIG. 5 by depicting the Self-FEXT Processor 511 as providing feedback to the Slicer 512.

Figure 8:
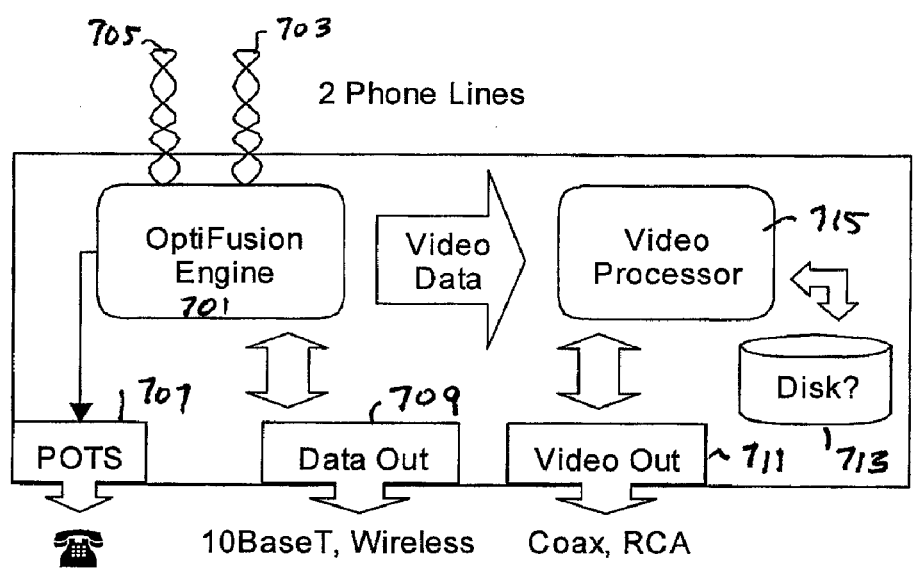
FIG. 8 is a block diagram of an application of principles of the present invention on dual twisted pair connections leading to a private home for video, data and voice delivery.

Referring now to FIG. 8, an application of the principles of the present invention to consumer DSL may be explained. As will be appreciated, the present invention involves the post-processing of multiple communication lines at the receiving end of a binder. In a typical consumer environment multiple twisted pairs enter the home but only one pair is enabled for POTS and xDSL service. As shown in FIG. 8, the principles of the present invention permit application to a two-line home-consumer DSL connection. Using principles disclosed in this application, the transmission masks may be made to conform to any one of the many flavors of DMT-based residential DSL (ADSL, G.lite, ADSL2, ADS L2+, VDSL, VDSL2), with MIMO post-processing of the signals received at the two receivers allowing greater data rates in both the upstream and downstream directions than if the two pairs were bonded without the MIMO post-processing disclosed in the present invention. The high bandwidth on the downstream side allows an internet service provider (ISP) to stream broadcast or pay-per-view video. This would enable such an ISP to directly compete with cable television providers, while at the same time increasing line utilization to those subscribers already purchasing multiple telephone lines.

FIG. 8 shows an end user product 700 which has the appearance of a "Cable Box", including video output connectors 711, a POTS connector (e.g., RJ-1) 707 and a data connector (e.g., RJ-45). Additional features may include an internal storage unit 713 that enables downloaded pay-per-view video to be stored and played, and a video processor 715 for handling video. The unit may also potentially include a channel indicator and remote (not shown). Internal to the unit, a post-processor 701 is coupled to two twisted pair lines 703 and 705 leading to the ILEC. Post-processor 701 utilizes principles of the present invention detailed above to provide multiple channels of communication. These include a narrowband Plain Old Telephone Service (POTS) channel which is converted to analog data on POTS connector 707, broadband data over IP available at connector 709 at a rate that is typical for high-end home DSL use.

It will be noted that binders in residential neighborhoods frequently have problems with AM and other RF ingress noise in the downstream xDSL frequency range. This type of interference typically limits the available bandwidth on DSL, but can be effectively reduced using principles of the present invention which is suited for identifying an eliminating such correlated or common-mode noise on plural channels. This implies that for a two-line system, one of the two receivers can be rendered free of AM and RF ingress. This will enable the types of downstream data rates that allow numerous advanced broadband services to be delivered. It is not unusual for most homes in upscale markets that would purchase high data rates to be wired for two phone lines, i.e., with dual twisted pairs.

It will be further noted that applying MIMO technology to large systems is often limited by the unwieldly matrix computations involved. In a two-line MIMO system, the amount of numerical computations is greatly reduced—and in some cases, potentially allowing simpler formulae to be used in signal processing.

It will be further appreciated that it may not be necessary to handle both upstream and downstream transmissions using MIMO techniques in accordance with principles of the present invention. Rather, because upstream bandwidth requirements typically are lower than downstream, upstream transmissions may be handled according to conventional xDSL technology, while downstream transmissions are optimized through the use of MIMO techniques as elaborated herein. In both cases, however, standard xDSL transmission masks are used at the DSLAM, and thus there is no need for new transmission standards to be approved. Also, echo cancellation issues are minimized because DMT-based xDSL technologies are frequency domain multiplexed, which means that different frequency bands are used for upstream and downstream transmission.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A multiline communication system utilizing multiple impaired signal paths for data communication, comprising a multi-channel processor receiving a plurality of signals that have been subjected to crosstalk and/or external interference noise in transmission over said impaired signal paths, the processor processing said multiple impaired signal paths and extracting each signal from the plurality of signals received over said impaired signal paths, said processing involving the use of multi-input multi-output processing, and wherein a noise pre-whitening matrix and a triangular matrix decision feedback demodulator are used at the processor to extract signals without requiring delivery of receiver parameters from said processor to the transmitter side of the signal paths, wherein the data communication includes bonded services.

2. The multiline communication system of claim 1 wherein said multi-input multi-output processing at said processor utilizes a multi-input multi-output processing matrix.

3. The multiline communication system of claim 2 wherein said multi-input multi-output processing matrix diagonalizes a noise correlation matrix.

4. The multiline communication system of claim 3 wherein said multi-input multi-output processing at said processor uses a matrix decomposed into an orthogonal and a triangular matrix.

5. The multiline communication system of claim 4 wherein said orthogonal and triangular matrix are combined with a transformation to diagonalize the noise covariance matrix of the signals received over said signal paths at a receiver.

6. The multiline communication system of claim 2 wherein said multi-input multi-output processing matrix triangularizes a main channel matrix.

7. The multiline communication system of claim 6 wherein a Decision Feedback Demodulator (DFD) is used to extract received symbols from the signals resulting from said triangular main channel matrix.

8. The multiline communication system of claim 1 wherein said plurality of signals are discrete multitone modulated signals delivered over said signal paths, and further comprising an inverse Fourier transformer converting said discrete multitone modulated signals to complex values for delivery to said processor for multi-input multi-output processing using complex matrix processing.

9. The multiline communication system of claim 8 wherein the complex values used in said complex matrix processing are computed from training data.

10. The multiline communication system of claim 8 wherein the complex values used in said complex matrix processing are adapted during data transmission.

11. A data communication appliance for communication of data over a plurality of impaired twisted pair signal paths, comprising a multiline processor connected to said twisted pair signal paths, said processor using multi-input multi-output processing to extract a plurality of different channels from said plural twisted pair signal paths, the different channels selected from the group comprising voice, POTS, video, video broadcast, pay-per-view video, and internet protocol data, and wherein a noise pre-whitening matrix and a triangular matrix decision feedback demodulator are used at the processor to extract signals without requiring delivery of receiver parameters from said processor to the transmitter side of the signal paths.

12. The data communication appliance of claim 11 wherein said multi-input multi-output processing involves the use of a multi-input multi-output processing matrix.

13. The data communication appliance of claim 12 wherein said processing matrix diagonalizes a noise correlation matrix.

14. The data communication appliance of claim 13 wherein said multi-input multi-output processing at said processor uses a matrix decomposed into an orthogonal and a triangular matrix.

15. The data communication appliance of claim 14 wherein said orthogonal and triangular matrix are combined with a transformation to diagonalize the noise covariance matrix of the signals received over said impaired signal paths at a receiver.

16. The data communication appliance of claim 12 wherein said multi-input multi-output processing matrix triangularizes a main channel matrix.

17. The data communication appliance of claim 16 wherein a Decision Feedback Demodulator (DFD) is used to extract received symbols from signals resulting from said triangular main channel matrix.

18. The data communication appliance of claim 11 wherein signals received over said impaired signal paths are discrete multitone modulated signals delivered over said twisted pair signal paths, and further comprising an inverse Fourier transformer converting said discrete multitone modulated signals to complex values for delivery to said processor for multi-input multi-output processing using complex matrix processing.

19. The data communication appliance of claim 18 wherein the complex values used in said complex matrix processing are computed from training data.

20. The data communication appliance of claim 18 wherein the complex values used in said complex matrix processing are adapted during data transmission.

* * * * *